United States Patent
Lim et al.

(10) Patent No.: US 9,244,267 B2
(45) Date of Patent: Jan. 26, 2016

(54) ELECTROWETTING DISPLAY DEVICE

(71) Applicant: Liquavista B.V., Eindhoven (NL)

(72) Inventors: Tae Woo Lim, Hwaseong-si (KR); Keunkyu Song, Yongin-si (KR); Jihoon Yang, Gwangju (KR); Tae Hyung Hwang, Seoul (KR)

(73) Assignee: Amazon Technologies, Inc., Seattle, WA (US)

( * ) Notice: Subject to any disclaimer, the term of this patent is extended or adjusted under 35 U.S.C. 154(b) by 257 days.

(21) Appl. No.: 13/763,979

(22) Filed: Feb. 11, 2013

(65) Prior Publication Data
US 2013/0301108 A1 Nov. 14, 2013

(30) Foreign Application Priority Data

May 9, 2012 (KR) .................. 10-2012-0049079

(51) Int. Cl.
*G02B 26/00* (2006.01)

(52) U.S. Cl.
CPC .................. *G02B 26/005* (2013.01)

(58) Field of Classification Search
CPC ............ G02B 2207/115; G02B 26/00; G02B 26/004; G02B 26/005; G02B 26/007–26/008
USPC .................. 359/227, 237, 290–297, 272
See application file for complete search history.

(56) References Cited

U.S. PATENT DOCUMENTS

| 7,872,790 | B2 | 1/2011 | Steckl et al. | |
|---|---|---|---|---|
| 2009/0059348 | A1* | 3/2009 | Niwano et al. | 359/296 |
| 2009/0260988 | A1 | 10/2009 | Pamula et al. | |
| 2009/0262435 | A1 | 10/2009 | Kim et al. | |
| 2010/0177026 | A1 | 7/2010 | Van Dijk et al. | |
| 2011/0032276 | A1 | 2/2011 | Chen et al. | |
| 2011/0147215 | A1 | 6/2011 | Fuchs et al. | |
| 2011/0235146 | A1 | 9/2011 | Feil et al. | |
| 2012/0281269 | A1* | 11/2012 | Yang et al. | 359/290 |
| 2014/0036341 | A1* | 2/2014 | Kwon et al. | 359/290 |

FOREIGN PATENT DOCUMENTS

| JP | 2008-170632 A | 7/2008 |
|---|---|---|
| KR | 1020060011039 A | 2/2006 |
| KR | 100723431 B1 | 5/2007 |
| KR | 1020110045538 A | 5/2011 |

* cited by examiner

*Primary Examiner* — Scott J Sugarman
*Assistant Examiner* — Robert E Tallman
(74) *Attorney, Agent, or Firm* — Lee & Hayes, PLLC (57) ABSTRACT

An electrowetting display device includes first and second barrier layers which cover first and second electrodes. The electrowetting display device includes a first base substrate which faces a second base substrate, the first electrode on the first base substrate, the first barrier layer which covers the first electrode, the second electrode on the second base substrate, the second barrier layer which covers the second electrode, a barrier wall between the first base substrate and the second base substrate, and an electrowetting layer between the first base substrate and the second base substrate. The barrier wall defines a pixel area corresponding to the first electrode, and the electrowetting layer is in the pixel area. The electrowetting layer includes a polar fluid and a non-polar fluid which are separated from each other.

20 Claims, 7 Drawing Sheets

ELECTROWETTING DISPLAY DEVICE

This application claims priority to Korean Patent Application No. 10-2012-0049079, filed on May 9, 2012, and all the benefits accruing therefrom under 35 U.S.C. §119, the contents of which are hereby incorporated by reference.

BACKGROUND

1. Field

The disclosure relates to an electrowetting display device operated by using an eletrowetting effect.

2. Description of the Related Art

As a flat panel display device, a liquid crystal display ("LCD"), a plasma display panel ("PDP"), an organic light emitting display ("OLED"), a field effect display ("FED"), an electrophoretic display ("EPD"), and an electrowetting display ("EWD"), etc., are well known.

Among them, the electrowetting display includes pixels, each of which includes a first electrode and a second electrode. The first and second electrodes are spaced apart from each other and different voltages are applied to the first and second electrodes. In addition, an electrowetting layer, which includes a non-polar fluid and a polar fluid, is disposed between the first and second electrodes. When voltages are respectively applied to the first and second electrodes, the polar fluid is polarized. In addition, when a difference of surface tension exists between the non-polar fluid and the polar fluid, the non-polar fluid is concentrated to a side of the pixels.

The polar fluid is an electrolyte solution, and a barrier layer is disposed on the first electrode to prevent the polar fluid from making contact with the first electrode.

SUMMARY

One or more exemplary embodiment of the disclosure provides an electrowetting display device capable of reducing a leakage current.

Embodiments of the invention provide an electrowetting display device which includes a first base substrate which faces a second base substrate, a first electrode disposed on the first base substrate, a first barrier layer which covers the first electrode, a second electrode on the second base substrate, and a second barrier layer which covers the second electrode. A barrier wall and an electrowetting layer are disposed between the first base substrate and the second base substrate. The barrier wall defines a pixel area corresponding to the first electrode, and an electrowetting layer includes a polar fluid and a non-polar fluid which remain separated from each other.

The electrowetting display device may further include a hydrophobic layer disposed on the first barrier layer. The first barrier layer may include a first inorganic layer which covers the first electrode, and a first organic layer disposed on the first inorganic layer. The second barrier layer may include a second inorganic layer.

The electrowetting display device may further include an organic layer disposed under the first electrode. The organic layer may have one of a red color, a green color and a blue color.

The first barrier layer and the second barrier layer may include an inorganic layer. The second barrier layer may be formed using a chemical vapor deposition process performed at a higher temperature than a chemical vapor deposition process forming the first barrier layer. The second barrier layer may have a larger density than the first barrier layer.

Each of the first barrier layer and the second barrier layer may include a plurality of layers stacked one on another.

According to one or more exemplary embodiment, the electrowetting display device includes the first and second barrier layers to cover the first and second electrodes. The first and second barrier layers protect the first and second electrodes from an electrowetting layer.

Although the first barrier layer may be damaged, the second barrier layer covers the second electrode so as to reduce an amount of leakage current. Accordingly, the electrowetting display device is normally operated even though the first barrier layer may be damaged.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

It will be understood that when an element or layer is referred to as being "on" or "connected to" another element or layer, it can be directly on, connected or coupled to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "above," "upper," "under" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" or "under" other elements or features would then be oriented "above" the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 1:
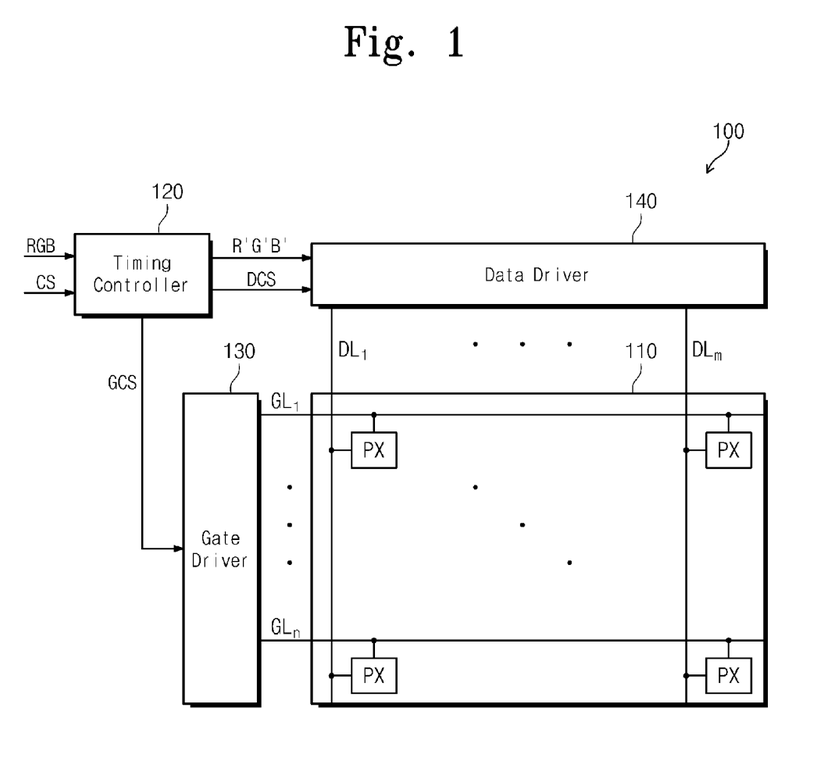
FIG. 1 is a block diagram showing an exemplary embodiment of an electrowetting display device according to the invention.

FIG. 1 is a block diagram showing an exemplary embodiment of an electrowetting display device according to the invention.

Referring to FIG. 1, an electrowetting display device 100 includes a display panel 110, a timing controller 120, a gate driver 130 and a data driver 140. The electrowetting display device 100 has a configuration changed in design according to an operation mode of the electrowetting display device 100, such as a reflective mode, a transmissive mode or a transflective mode. In other words, the electrowetting display apparatus 100 may further include a backlight unit (not shown) but is not limited thereto or thereby.

The display panel 110 includes a plurality of gate lines $GL_1$ to $GL_n$, a plurality of data lines $DL_1$ to $DL_m$, and a plurality of pixels PX each of which is connected to a corresponding gate line of the gate lines $GL_1$ to $GL_n$ and a corresponding data line of the data lines $DL_1$ to $DL_m$. The pixels PX may be arranged in 'n' rows by 'm' columns.

The gate lines $GL_1$ to $GL_n$ are connected to the gate driver 130 and receive gate signals. The data lines $DL_1$ to $DL_m$ are connected to the data driver 140 and receive data signals.

The timing controller 120 receives image signals RGB and control signals CS from an external source (not shown). The timing controller 120 converts a data format of the image signals RGB to a data format appropriate to an interface between the data driver 140 and the timing controller 120. The timing controller 120 provides the converted image signals R'G'B' to the data driver 140.

In addition, the timing controller 120 generates a data control signal DCS and a gate control signal GCS in response to the control signals CS. The timing controller 120 applies the gate control signal GCS to the gate driver 130 and applies the data control signal DCS to the data driver 140.

The gate driver 130 sequentially outputs the gate signals in response to the gate control signals GCS from the timing controller 120. The gate signals are sequentially applied to the gate lines $GL_1$ to $GL_n$, and thus the pixels PX are turned on in a row unit or row-by-row.

The data driver 140 converts the image signals R'G'B' to data voltages, e.g., data signals, in response to the data control signal DCS and outputs the data voltages. The data voltages are applied to the pixels PX through the data lines $DL_1$ to $DL_m$.

Figure 2:
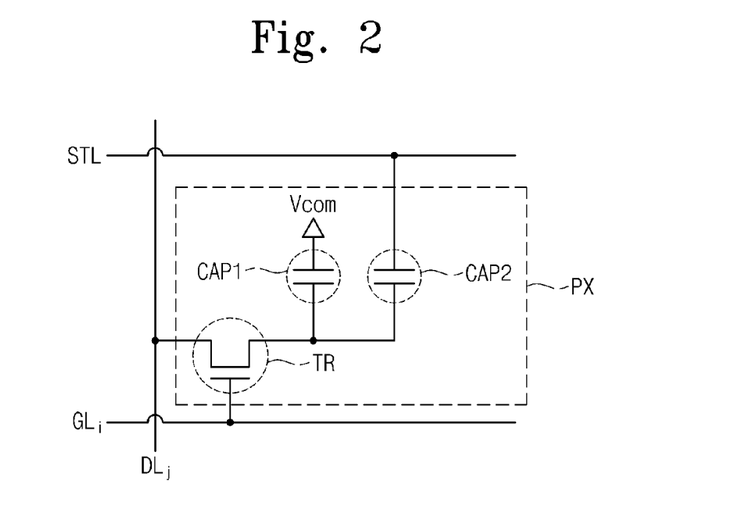
FIG. 2 is an equivalent circuit diagram of an exemplary embodiment of a pixel shown in FIG. 1.
Figure 3:
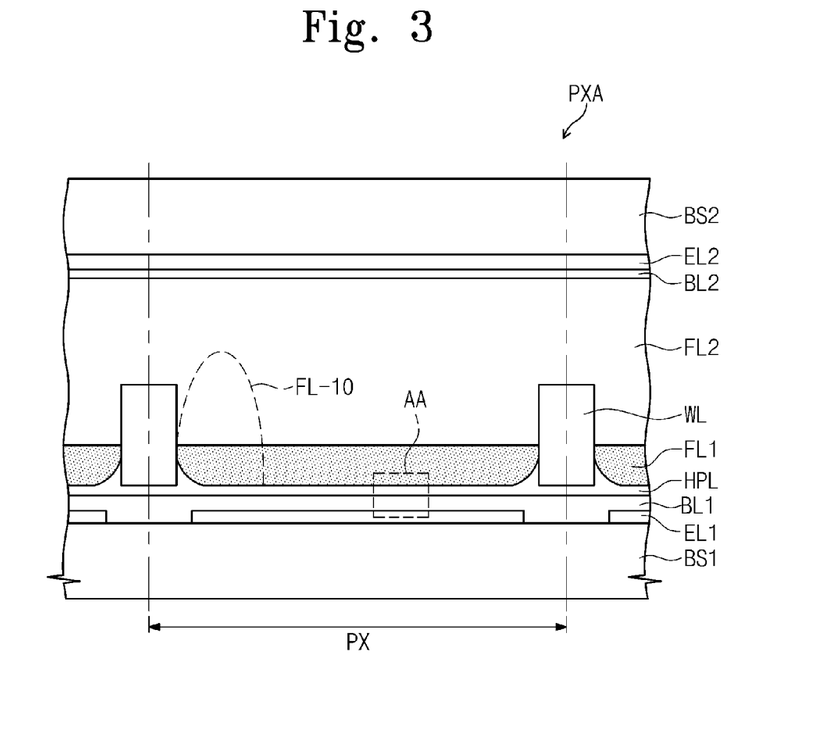
FIG. 3 is a cross-sectional view an exemplary embodiment of a pixel of a display panel shown in FIG. 1.

FIG. 2 is an equivalent circuit diagram of an exemplary embodiment of a pixel shown in FIG. 1, FIG. 3 is a cross-sectional view of an exemplary embodiment of a pixel of a display panel shown in FIG. 1, and FIGS. 4A to 4C are cross-sectional views showing exemplary embodiments of portion AA of the pixel shown in FIG. 3. Each of the pixels PX shown in FIG. 1 has the same structure as shown in FIGS. 2 and 3, and thus one pixel will be described in detail with reference to FIGS. 2 and 3.

Referring to FIG. 2, the pixel PX includes a switching device TR, a first capacitor CAP1 and a second capacitor CAP2. The switching device TR may be a thin film transistor that includes a control terminal, an output terminal and an input terminal. In an alternative exemplary embodiment, the pixel PX may include two or more switching devices TR. Hereinafter, the switching device TR will be referred to as the thin film transistor.

The thin film transistor TR is connected to one gate line $GL_i$, one data line $DL_j$ and the first and second capacitors CAP1 and CAP2, but is not limited thereto or thereby. The thin film transistor TR outputs the data voltage applied to the data line $DL_j$ to the first capacitor CAP1 and the second capacitor CAP2 in response to the gate voltage applied to the gate line $GL_i$.

The first capacitor CAP1 is an electrowetting capacitor including a first electrode, a second electrode and a fluid (not shown) provided between the first electrode and the second electrode. Hereinafter, the first electrode will be referred to as a pixel electrode connected to the thin film transistor TR and the second electrode will be referred to as a common electrode applied with a common voltage Vcom.

The second capacitor CAP2 is a storage capacitor including a first electrode connected to the thin film transistor TR, a second electrode connected to a storage line STL and an insulating layer (not shown) disposed between the first electrode and the second electrode.

Referring to FIG. 3, the display panel 110 includes a first base substrate BS1 and a second base substrate BS2. Although not shown in FIG. 3, the gate lines $GL_1$ to $GL_n$ and the data lines $DL_1$ to $DL_m$ are disposed on the first base substrate BS1.

The first base substrate BS1 and/or the second base substrate BS2 may be a transparent substrate, e.g., a glass substrate, a plastic substrate, etc.

The pixel electrode EL1 is disposed on the first base substrate BS1. Although not shown in FIG. 3, a plurality of insulating layers is disposed between the first base substrate BS1 and the pixel electrode EL1.

A first barrier layer BL1 is disposed on the first base substrate BS1 to cover the pixel electrode EL1. The first barrier layer BL1 overlaps the pixel electrode EL1, and may contact upper and/or side surfaces of the pixel electrode EL1, but is not limited thereto or thereby. The first barrier layer BL1 may include an organic layer or an inorganic layer. In addition, the first barrier layer BL1 may have a multi-layer structure in which the organic layer and the inorganic layer are stacked one on another. The inorganic layer may include silicon oxide, silicon nitride or alumina, but is not limited thereto or thereby.

A hydrophobic layer HPL is disposed on the first barrier layer BL1. The hydrophobic layer HPL reflects or transmits light incident thereto. The hydrophobic layer HPL may reflect a specific wavelength of the incident light. The light incident to the hydrophobic layer HPL may be natural light in outdoor or artificial light from a light source, such as a backlight unit.

Figure 4A:
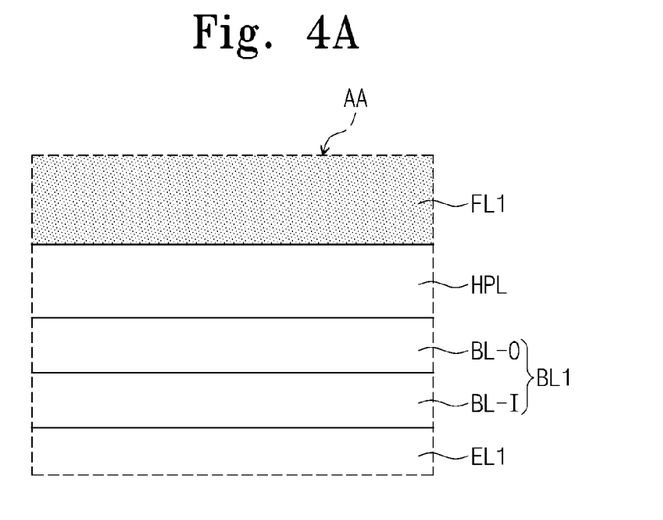
FIGS. 4A to 4C are cross-sectional views showing exemplary embodiments of portion AA of the pixel shown in FIG. 3.

Referring to FIG. 4A, the first barrier layer BL1 includes an inorganic layer BL-I covering the pixel electrode EL1 and an organic layer BL-O disposed on the inorganic layer BL-I. The inorganic layer BL-I has a moisture transmission rate lower than that of the organic layer BL-O so as to prevent an electrowetting layer from infiltrating the pixel electrode EL1.

The organic layer BL-O prevents the electrowetting layer from infiltrating the pixel electrode EL1 and enhances cohesive force of the hydrophobic layer HPL. That is, the cohesive force between the hydrophobic layer HPL and the organic layer BL-O is greater than the cohesive force between the hydrophobic layer HPL and the inorganic layer BL-I. The organic layer BL-O has an insulating property higher than that of the inorganic layer BL-I so as to reduce the amount of leakage current.

Figure 4B:
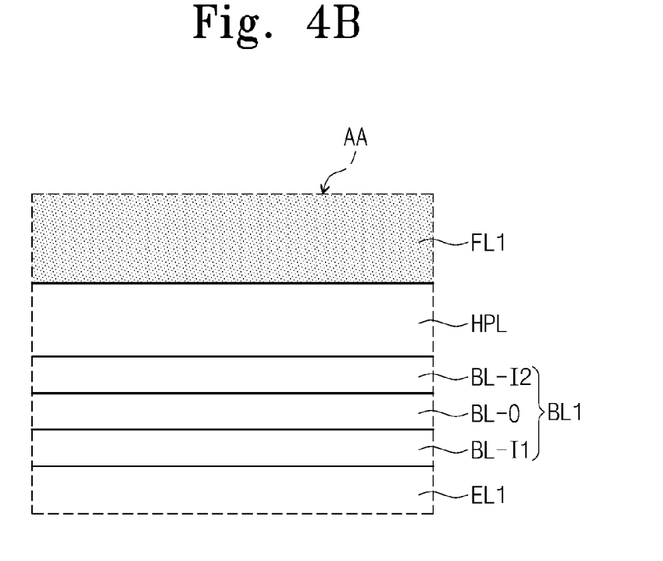

Referring to FIG. 4B, the first barrier layer BL1 may include a first inorganic layer BL-I1 covering the pixel electrode EL1, the organic layer BL-O disposed on the first inorganic layer BL-I1, and a second inorganic layer BL-I2 disposed on the organic layer BL-O. The first inorganic layer BL-I1 and the second inorganic layer BL-I2 have the same material or different materials from each other.

Figure 4C:
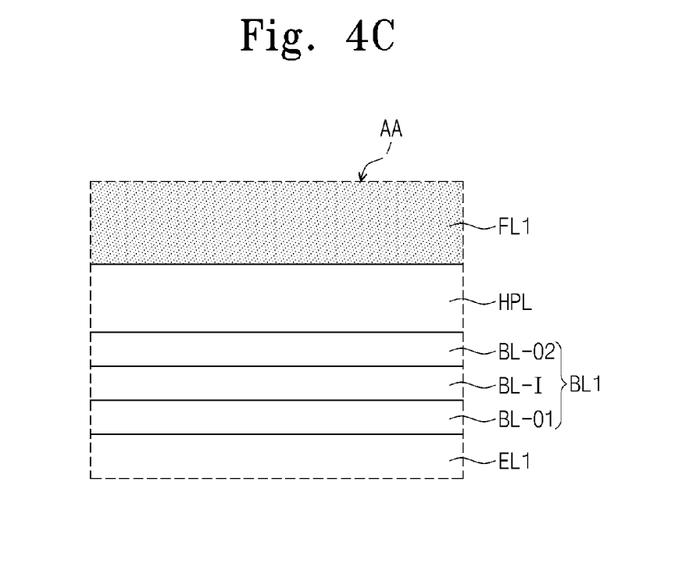

As shown in FIG. 4C, the first barrier layer BL1 includes a first organic layer BL-O1 covering the pixel electrode EL1, the inorganic layer BL-I disposed on the first organic layer BL-O1, and a second organic layer BL-O2 disposed on the inorganic layer BL-I. The first organic layer BL-O1 and the second organic layer BL-O2 have the same material or different materials from each other.

Referring back to FIG. 3, a barrier wall WL is disposed on the hydrophobic layer HPL and on the first base substrate BS1. The barrier wall WL defines a pixel area PXA corresponding to the pixel PX. The barrier wall WL is disposed between adjacent pixels to reduce or effectively prevent the first fluid FL1 in the pixel PX from being mixed with the first fluid FL1 in an adjacent pixel. In addition, the barrier wall WL has a same polarity as that of the first fluid FL1 such that the barrier wall WL pushes or repels the first fluid FL1.

In an alternative exemplary embodiment, the barrier wall WL may be disposed on the second base substrate BS2.

The second base substrate BS2 is disposed spaced apart from the first base substrate BS1. The common electrode EL2 is disposed on a surface of the second base substrate BS2, such as on a lower surface of the second base substrate BS2. The common electrode EL2 may be directly on the second base substrate BS2, but is not limited thereto or thereby.

A second barrier layer BL2 is disposed on the second base substrate BS2 to cover the common electrode EL2. The second barrier layer BL2 overlaps the common electrode EL2, and may contact upper and/or side surfaces of the common electrode EL2, but is not limited thereto or thereby. The second barrier layer BL2 may include an organic layer or an inorganic layer.

Although not shown in figures, similar to the first barrier layer BL1 shown in FIGS. 4B and 4C, the second barrier layer BL2 may have a multi-layer structure in which the organic layer and the inorganic layer are stacked one on another. Details of the second barrier layer BL2 will be described later.

The electrowetting layer may include the first fluid FL1 and a second fluid FL2. The first fluid FL1 and the second fluid FL2 are disposed between the first base substrate BS1 and the second base substrate BS2. The first fluid FL1 and the second fluid FL2 are not mixed with each other and remain separate from each other.

The first fluid FL1 is a non-polar material, e.g., a hydrophobic material. The first fluid FL1 is disposed in a space defined by the hydrophobic layer HPL and the barrier wall WL.

The first fluid FL1 absorbs the light incident thereto. The first fluid FL1 may absorb a specific wavelength of the light incident thereto. The first fluid FL1 may include a dye having a specific color. In an exemplary embodiment, the first fluid FL1 may include a solvent and a solute dissolved in the solvent, e.g., a dye. The specific wavelength absorbed by the first fluid FL1 depends on the color of the dye.

The second fluid FL2 is a polar material, e.g., a hydrophilic material. The second fluid FL2 may be an electrolyte solution, e.g., a mixture of water and ethyl alcohol, in which potassium chloride is dissolved.

The second fluid FL2 is transparent. In addition, the second fluid FL2 is disposed between the first fluid FL1 and the second base substrate BS2. According to an exemplary embodiment, the second fluid FL2 may have a color.

When a voltage is applied to the pixel PX, the first fluid FL1 is concentrated. In detail, when the voltages are respectively applied to the pixel electrode EU and the common electrode EL2, the second fluid FL2 is polarized and moves the first fluid FL1. The first fluid FL1 may be moved by the second fluid FL2 to expose the hydrophobic layer HPL, and thus the second fluid FL2 makes contact with the hydrophobic layer HPL. The moved first fluid FL1 may be concentrated to a side of the pixel area PXA in accordance with the movement of the second fluid FL2.

Hereinafter, a state in which the voltage is not applied to the pixel PX is referred to as an off-state and a state in which the voltage is applied to the pixel PX is referred to as an on-state. In the off-state, the expression that the voltage is not applied to the pixel PX means that the pixel electrode EU and the common electrode EL2 are applied with the same voltage.

In the on-state, the pixel electrode EU and the common electrode EL2 are applied with different voltages from each other. In one exemplary embodiment, for instance, the pixel electrode EL1 is applied with a pixel voltage lower than the common voltage during the on-state.

In the off-state, the first fluid FL1 is dispersed over the pixel area PXA. In the off-state, the first fluid FL1 may overlap an entire of the space defined by the hydrophobic layer HPL and the barrier wall WL, in the plan view. In this case, the pixel PX displays the color, e.g., a black color.

In the on-state, the first fluid FL1 is pushed to the side of the pixel area PXA by the second fluid FL2. That is, the first fluid FL1 is pushed to the barrier wall WL. The first fluid FL1 has a shape FL-10 represented by a dotted line as shown in FIG. 3 during the on-state, when the first fluid FL1 is pushed to the barrier wall WL. Due to the movement of the first fluid FL1, the surface of the hydrophobic layer HPL is exposed. The light is reflected by or transmits through the exposed surface of the hydrophobic layer HPL.

When the voltage applied to the pixel PX is stopped, the first fluid FL1 moves and again covers the hydrophobic layer HPL.

In the on-state, the second fluid FL2 is polarized by the voltage applied to the pixel PX. In a case that the pixel electrode EL1 and the common electrode EL2 make contact with the second fluid FL2 in the on-state, the pixel electrode EU and the common electrode EL2 are electrically shorted. When the pixel electrode EL1 and the common electrode EL2 are electrically shorted, the electrowetting display device 100 is malfunctioned.

In one or more exemplary embodiment according to the invention, the second barrier layer BL2 protects the common electrode EL2 from the second fluid FL2. That is, the second barrier layer BL2 between the second fluid FL2 and the common electrode EL2 reduces or effectively prevents contact of the second fluid FL2 and the common electrode EL2. Although defects occur in the first barrier layer BL1 and the hydrophobic layer HPL, electrical shorting of the pixel electrode EL1 and the common electrode EL2 is reduced or effectively prevented since the common electrode EL2 is covered by the second barrier layer BL2.

In order to easily induce polarization of the second fluid FL2, the first barrier layer BL1 has a thickness equal to or smaller than about 500 nanometers (nm). In addition, the first barrier layer BL1 has a thickness equal to or larger than about 300 nm so as to reduce or effectively prevent infiltration of the electrowetting layer to the pixel electrode EL1. That is, the thickness of the first barrier layer BL1 may be between about 300 nm and about 500 nm.

Figure 5:
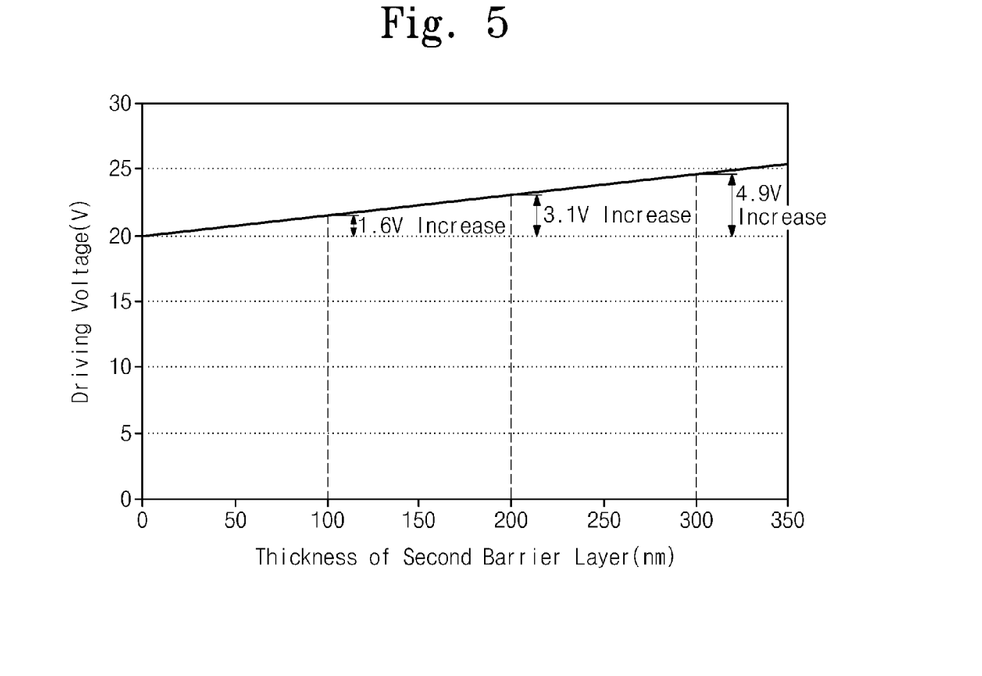
FIG. 5 is a graph showing a driving voltage in volts (V) versus a thickness of a second barrier layer in nanometers (nm), of an exemplary embodiment of an electrowetting display device according to the invention.

FIG. 5 is a graph showing a driving voltage in volts (V) versus thickness of a second barrier layer in nanometers (nm) of an exemplary embodiment of an electrowetting display device according to the invention. The graph shown in FIG. 5 is obtained by measuring the electrowetting display device under the following conditions.

The first barrier layer BL1 includes a first silicon nitride layer with a thickness of about 100 nm, a silicon oxide disposed on the first silicon nitride layer and having a thickness of about 100 nm, and a second silicon nitride layer disposed on the silicon oxide and having a thickness of about 100 nm. The hydrophobic layer HPL has a thickness of about 200 nm. The second barrier layer BL2 is a silicon nitride layer.

The graph shown in FIG. 5 shows an increase rate of the driving voltage with the thickness of the second barrier layer BL2. In a case that the second barrier layer BL2 is omitted, the driving voltage of the electrowetting display device is about 20 volts.

When the thickness of the second barrier layer BL2 is about 100 nm, the driving voltage is about 21.6 volts, and the driving voltage is about 24.9 volts when the thickness of the second barrier layer BL2 is about 300 nm. When the second barrier layer BL2 is about 300 nm, the increase rate of the driving voltage is about 25%.

The increase rate of the driving voltage depends on materials of the second barrier layer BL2. In one exemplary embodiment, the thickness of the second barrier layer BL2 may be equal to or smaller than about 300 nm in order to reduce the driving voltage.

Figure 6:
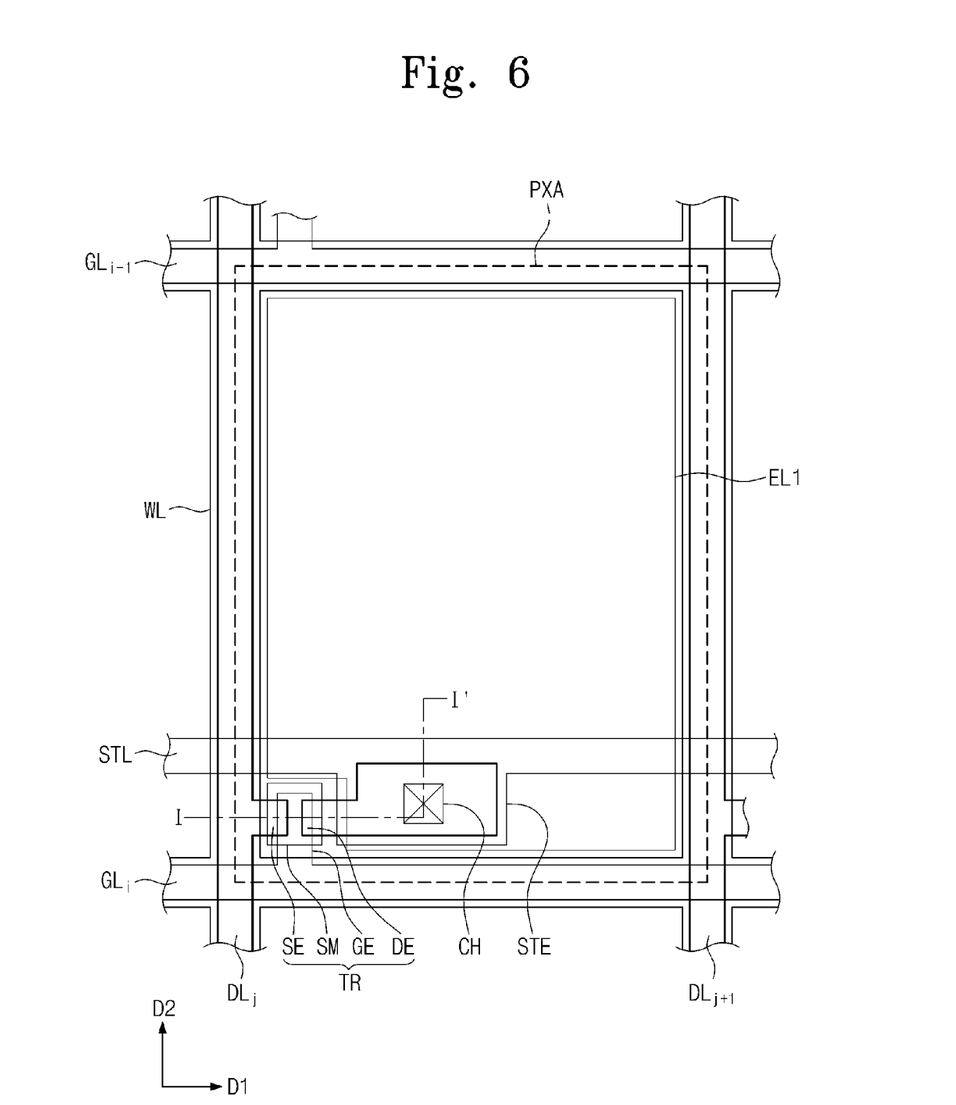
FIG. 6 is a plan view showing an exemplary embodiment a pixel according to the invention.
Figure 7:
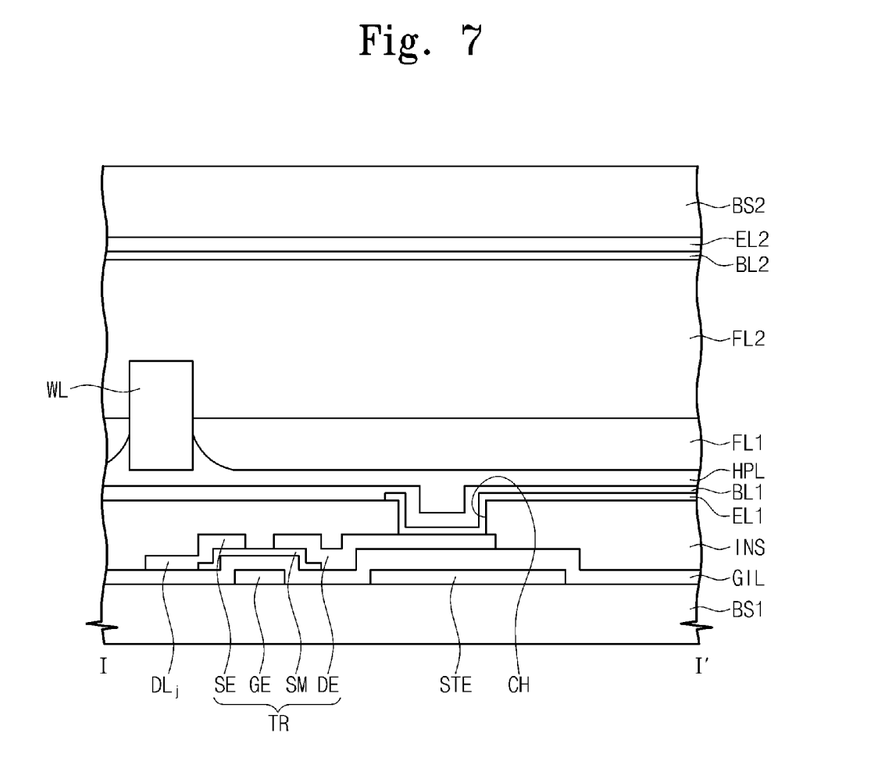
FIG. 7 is a cross-sectional view taken along line I-I' of FIG. 6.

FIG. 6 is a plan view showing an exemplary embodiment of a pixel according to the invention and FIG. 7 is a cross-sectional view taken along a line I-I' of FIG. 6. In FIGS. 6 and 7, an area surrounded by the barrier wall WL is referred to as the pixel area PXA and the pixel PX is disposed in the pixel area PXA. In FIGS. 6 and 7, the same elements as those shown in FIGS. 1 to 5 are omitted. In addition, the second base substrate BS2 and the common electrode EL2 are omitted in FIG. 6.

The gate lines $GL_{i-1}$ and $GL_i$ have a longitudinal axis which is extended in a first direction D1. The gate lines $GL_{i-1}$ and $GL_i$ are on the surface of the first base substrate BS1. A gate electrode GE of the thin film transistor TR is branched from one gate line $GL_i$ of the gate lines $GL_{i-1}$ and $GL_i$.

In addition, the storage line STL has a longitudinal axis which is extended in the first direction D1 on the surface of the first base substrate BS1. A storage electrode STE is branched from the storage line STL. The storage electrode STE serves as a second electrode of the second capacitor CAP2 shown in FIG. 2.

A gate insulating layer GIL is disposed on the first base substrate BS1 and covers the gate electrode GE and the storage electrode STE. The gate insulating layer GIL may include silicon nitride or silicon oxide.

A semiconductor layer SM of the thin film transistor TR is disposed on the gate insulating layer GIL. The semiconductor layer SM overlaps the gate electrode GE while interposing the gate insulating layer GIL therebetween. The semiconductor layer SM may include an active layer disposed on the gate insulating layer GIL and an ohmic contact layer disposed on the active layer, but is not limited thereto or thereby.

The data lines $DL_j$ and $DL_{j+1}$ have a longitudinal axis which is extended in a second direction D2. The data lines $DL_j$ and $DL_{j+1}$ are on the gate insulating layer GIL. A source electrode SE of the thin film transistor TR is branched from one data line $DL_j$ of the data lines $DL_j$ and $DL_{j+1}$. The source electrode SE overlaps the semiconductor layer SM.

A drain electrode DE of the thin film transistor TR is disposed on the gate insulating layer GIL. The drain electrode DE is spaced apart from the source electrode SE and overlaps the semiconductor layer SM.

An area between the source electrode SE and the drain electrode DE is used as a channel portion of the thin film transistor TR. An upper surface of the active layer of the thin film transistor TR may be exposed at the channel portion. When the thin film transistor TR is turned on, an electrical current flows through the channel portion between the source electrode SE and the drain electrode DE.

An organic layer INS is disposed on the gate insulating layer GIL and covers the source electrode SE, the drain electrode DE and the channel portion. The organic layer NS is a planarization layer that provides a planar surface. The organic layer NS may provide a color filter having a red, green or blue color.

The pixel electrode EL1 is disposed on the organic layer NS. The pixel electrode EL1 is electrically and/or physically connected to the drain electrode DE through a contact hole CH. In the exemplary embodiment, a portion of the drain electrode DE serves as a first electrode of the second capacitor CAP2.

In a transmissive-type electrowetting display device, the pixel electrode EL1 may include a transparent material, such as indium tin oxide ("ITO"), indium zinc oxide ("IZO"), indium tin zinc oxide ("ITZO"), etc.

In a reflective-type electrowetting display device, the pixel electrode EU may include a reflective material, such as a metal material, e.g., aluminum. In addition, in a case that the electrowetting display device is a transflective type, the pixel electrode EU may include a reflection portion which reflects the natural light from the outside and a transmission portion which transmits the natural light.

The first barrier layer BL1 is disposed on the organic layer NS and covers the pixel electrode EL1. The hydrophobic layer HPL is disposed on the first barrier layer BL1. The barrier wall WL is disposed on the hydrophobic layer HPL. The barrier wall WL overlaps the gate lines $GL_{i-1}$ and $GL_i$ and the data lines $DL_j$ and $DL_{j+1}$.

The common electrode EL2 is disposed on the second base substrate BS2 which is disposed spaced apart from the first base substrate BS1. The second barrier layer BL2 is disposed on the common electrode EL2.

Each of the first barrier layer BL1 and the second barrier layer BL2 may include the organic layer or the inorganic layer. In addition, the first barrier layer BL1 and the second barrier layer BL2 may have the multi-layer structure in which the organic layer and the inorganic layer are stacked one on another.

In an exemplary embodiment of manufacturing the electrowetting display device 100, the inorganic layer of the first barrier layer BL1 and the second barrier layer BL2 may be formed by a chemical vapor deposition process. The inorganic layer of the first barrier layer BL1 may be formed by a low temperature chemical vapor deposition process so as to reduce or effectively prevent damage to the organic layer INS disposed on the first base substrate BS1 during a manufacturing process.

Since an organic layer is not disposed on the second base substrate BS2 different from the first base substrate BS1, the inorganic layer of the second barrier layer BL2 may be formed by a high temperature chemical vapor deposition process as compared to forming the first barrier layer BL1 including the inorganic layer.

The second barrier layer BL2 formed by the high temperature chemical vapor deposition process has a larger density than that of the first barrier layer BL1. Although the thickness of the second barrier layer BL2 is relatively small such that the second barrier layer BL2 is thin, the second barrier layer BL2 has high leakage current prevention effect. This will be described in detail with reference to FIG. 8.

Figure 8:
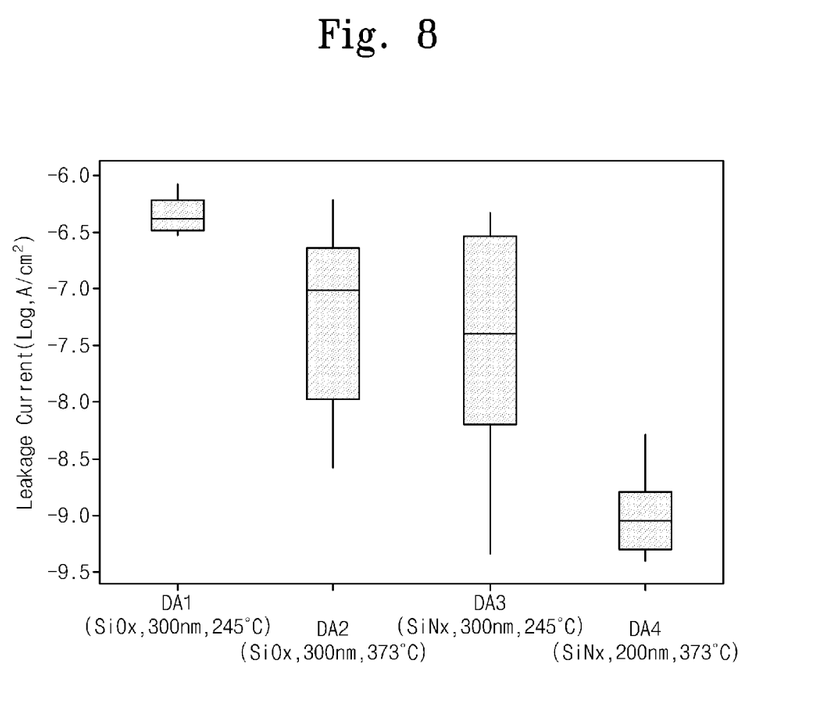
FIG. 8 is a graph showing a leakage current in ampere per square centimeter ($A/cm^2$) according to exemplary embodiments of barrier layers.

FIG. 8 is a graph showing the leakage current as a log function of ampere per square centimeter ($A/cm^2$), e.g., a range of leakage current, according to exemplary embodiments of barrier layers formed at different process temperatures using different materials. In first to fourth experimental examples DA1 to DA4, either the first electrode or the second electrode is covered by the barrier layer.

The barrier layer in the first experimental example DA1 is the silicon oxide (SiOx) layer and is formed at a temperature of about 245 degrees Celsius (° C.) using the chemical vapor deposition process. The barrier layer of the first experimental example DA1 has a thickness of about 300 nm. The temperature of about 245° C. is a critical temperature at which the organic layer is not damaged and is recognized as a low temperature in view of the chemical vapor deposition process.

In the second experimental example DA2, the barrier layer is the silicon oxide layer and is formed at a temperature of about 373° C. using the chemical vapor deposition process. The barrier layer of the second experimental example DA2 has a thickness of about 300 nm.

As shown in FIG. 8, since the barrier layer of the second experimental example DA2 is formed using the chemical vapor deposition process performed at a relatively high temperature, the barrier layer of the second experimental example DA2 may reduce the leakage current even though the barrier layer of the second experimental example DA2 has the same thickness as that of the barrier layer of the first experimental example DA1. Referring to FIG. 8, the leakage current in the second experimental example DA2 is about $1.6 \times 10^{-7}$ $A/cm^2$ that is an intermediate value among several experimental values, and this value is one-third times smaller than the leakage current of about $4.8 \times 10^{-7}$ $A/cm^2$, which is an intermediate value among several experimental values, in the first experimental example DA1.

The barrier layer in the third and fourth experimental examples DA3 and DA4 is the silicon nitride layer. The barrier layer of the third experimental example DA3 has a thickness of about 300 nm and is formed at a temperature of about 245° C. using the chemical vapor deposition process. The barrier layer of the fourth experimental example DA4 has a thickness of about 200 nm and is formed at a temperature of about 373° C. using the chemical vapor deposition process.

As shown in FIG. 8, the barrier layer of the fourth experimental example DA4 is formed using the chemical vapor deposition process performed at a relatively high temperature. The barrier layer of the fourth experimental example DA4 may reduce the leakage current. The leakage current of the fourth experimental example DA4 is lower than the leakage current of the third experimental example DA3, even though the barrier layer of the fourth experimental example DA4 is thinner than the barrier layer of the barrier layer of the third experimental example DA3. Referring to FIG. 8, the leakage current in the third experimental example DA3 is about $1.3 \times 10^{-7}$ $A/cm^2$ that is an intermediate value among several experimental values, and the leakage current of the fourth experimental example DA4 is about $1.5 \times 10^{-9}$ $A/cm^2$, which is an intermediate value among several experimental values, in the fourth experimental example DA4.

According to FIG. 8, the barrier layer formed at a higher temperature by using the chemical vapor deposition process has a leakage current prevention effect higher than that of the barrier layer formed at the lower temperature by using the chemical vapor deposition process. Thus, the second barrier layer BL2 of one or more exemplary embodiment of the electrowetting display device according to the invention may have the thickness smaller than the thickness of the first barrier layer BL1. In one exemplary embodiment, for example, the thickness of the second barrier layer BL2 is equal to or smaller than about 300 nm.

Although the electrowetting display device includes the second barrier layer BL2, the increase rate of the driving voltage is small since the thickness of the second barrier layer BL2 is thin.

Table 1 below shows leakage currents of a comparative example of an electrowetting display device that includes only the first barrier layer BL1 and leakage currents of an exemplary embodiment of the electrowetting display device that includes both the first and second barrier layers BL1 and BL2.

The first barrier layer BL1 includes the silicon nitride layer having a thickness of about 100 nm, the silicon oxide layer having a thickness of about 50 nm, and a silicon nitride layer having a thickness of about 350 nm. The layers are sequentially deposited at the temperature of about 245° C. using the chemical vapor deposition process. The second barrier layer BL2 includes the silicon nitride layer having a thickness of about 250 nm and is formed at the temperature of about 373° C. using the chemical vapor deposition process.

The leakage currents shown in Table 1 are measured at plural positions on the electrowetting display device. In the case of the electrowetting display device including only the first barrier layer BL1, the leakage current is measured at four positions. For the exemplary embodiment of the electrowetting display device, the leakage current is measured at sixteen positions in the electrowetting display device.

TABLE 1

|  | Common electrode | Common electrode/ second barrier layer BL2 | Common electrode/ second barrier layer BL2 | Common electrode/ second barrier layer BL2 | Common electrode/ second barrier layer BL2 |
| --- | --- | --- | --- | --- | --- |
| Pixel electrode/ First barrier layer BL1 | $1.45 \times 10^{-8}$ | $6.31 \times 10^{-10}$ | $9.52 \times 10^{-10}$ | $9.30 \times 10^{-9}$ | $1.48 \times 10^{-9}$ |
| Pixel electrode/ First barrier layer BL1 | $9.68 \times 10^{-8}$ | $6.67 \times 10^{-10}$ | $8.27 \times 10^{-10}$ | $1.01 \times 10^{-8}$ | $1.8 \times 10^{-9}$ |
| Pixel electrode/ First barrier layer BL1 | $6.94 \times 10^{-8}$ | $6.32 \times 10^{-10}$ | $2.16 \times 10^{-9}$ | $2.81 \times 10^{-9}$ | $3.08 \times 10^{-9}$ |
| Pixel electrode/ First barrier layer BL1 | $1.87 \times 10^{-8}$ | $7.37 \times 10^{-10}$ | $2.33 \times 10^{-9}$ | $1.13 \times 10^{-8}$ | $3.07 \times 10^{-9}$ |

As shown in Table 1, the electrowetting display device including only the first barrier layer BL1 has the leakage current higher than the exemplary embodiment of the electrowetting display device according to the invention. The electrowetting display device including only the first barrier layer BL1 has the leakage current, which is one hundred times higher than that of the exemplary embodiment electrowetting display device.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An electrowetting display device comprising:
   a first base substrate which faces a second base substrate;
   a first electrode on the first base substrate;
   a first barrier layer which at least partially covers the first electrode;
   a second electrode on the second base substrate;
   a second barrier layer which at least partially covers the second electrode wherein the second barrier layer comprises a stacked barrier structure that includes a first inorganic layer, a first organic layer, and a second inorganic layer;
   a barrier wall disposed in a region between the first base substrate and the second base substrate, wherein the barrier wall defines a pixel corresponding to the first electrode; and
   an electrowetting layer in the pixel, disposed in the region between the first base substrate and the second base substrate, and comprising a first fluid and a second fluid, wherein the first fluid is an electrolyte solution and the second fluid is immiscible with the first fluid.

2. The electrowetting display device of claim 1, further comprising a hydrophobic layer on the first barrier layer.

3. The electrowetting display device of claim 2, wherein the first barrier layer comprises (i) a third inorganic layer which covers the first electrode, and (ii) a second organic layer on the third inorganic layer.

4. The electrowetting display device of claim 1, further comprising a second organic layer between the first electrode and the first base substrate.

5. The electrowetting display device of claim 4, wherein the second organic layer has one of a red color, a green color and a blue color.

6. The electrowetting display device of claim 4, wherein the first barrier layer comprises a third inorganic layer.

7. The electrowetting display device of claim 1, wherein the first barrier layer comprises a plurality of layers of different materials.

8. The electrowetting display device of claim 7, wherein at least one of the plurality of layers of the first barrier layer comprises a third inorganic layer.

9. The electrowetting display device of claim 8, wherein the third inorganic layer comprises a silicon oxide, a silicon nitride or an alumina.

10. The electrowetting display device of claim 8, wherein at least one of the plurality of layers of the first barrier layer comprises a second organic layer.

11. The electrowetting display device of claim 7, wherein the second barrier layer comprises a plurality of layers of different materials.

12. The electrowetting display device of claim 11, wherein at least one of the plurality of layers of the second barrier layer comprises a silicon oxide, a silicon nitride or an alumina.

13. The electrowetting display device of claim 12, wherein at least one of the plurality of layers of the second barrier layer comprises a second organic layer.

14. The electrowetting display device of claim 1, wherein the barrier wall is hydrophilic.

15. The electrowetting display device of claim 1, wherein the first barrier layer has a thickness equal to or greater than about 300 nanometers, and equal to or smaller than about 500 nanometers.

16. The electrowetting display device of claim 1, wherein the second barrier layer has a thickness equal to or smaller than about 300 nanometers.

17. A method of manufacturing an electrowetting display device, the method comprising:
   providing a first electrode on a first base substrate;
   providing a first barrier layer which at least partially covers the first electrode;
   providing a second electrode on a second base substrate, wherein the first base substrate faces the second base substrate;
   providing a second barrier layer which at least partially covers the second electrode, wherein the second barrier layer comprises a stacked barrier structure that includes a first organic layer, a first inorganic layer, and a second organic layer;
   providing a barrier wall in a region between the first base substrate and the second base substrate, wherein the barrier wall defines a pixel corresponding to the first electrode; and
   providing an electrowetting layer in the pixel, and in the region between the first base substrate and the second base substrate, wherein the electrowetting layer includes a first fluid and a second fluid, wherein the first fluid is an electrolyte solution and the second fluid is immiscible with the first fluid.

18. The method of claim 17, wherein the providing the second barrier layer comprises a chemical vapor deposition process performed at a first temperature, the providing the first barrier layer comprises a chemical vapor deposition process performed at a second temperature, the first temperature being higher than the second temperature, and the second barrier layer has a larger density than the first barrier layer.

19. The electrowetting display device of claim 1, wherein the first barrier layer further comprises a stacked barrier structure that includes a third inorganic layer, a second organic layer, and a fourth inorganic layer.

20. The electrowetting display device of claim 1, wherein the first barrier layer further comprises a stacked barrier structure that includes a second organic layer, a third inorganic layer, and a third organic layer.

* * * * *